US011483420B2

(12) United States Patent
Korenwaitz et al.

(10) Patent No.: US 11,483,420 B2
(45) Date of Patent: Oct. 25, 2022

(54) FAST NETWORK RECOGNITION OF ACTIVE APPLICATIONS FOR REAL TIME USER NOTIFICATION

(71) Applicant: NETSPARK LTD, Giva't Shmu'el (IL)

(72) Inventors: Elyasaf Korenwaitz, Elon Moreh (IL); Zvi Bazak, Jerusalem (IL); Matanya Ofan, Yitzhar (IL)

( * ) Notice: Subject to any disclaimer, the term of this patent is extended or adjusted under 35 U.S.C. 154(b) by 0 days.

(21) Appl. No.: 17/281,597

(22) PCT Filed: Nov. 2, 2020

(86) PCT No.: PCT/IL2020/051136
§ 371 (c)(1),
(2) Date: Mar. 31, 2021

(87) PCT Pub. No.: WO2021/111430
PCT Pub. Date: Jun. 10, 2021

(65) Prior Publication Data
US 2021/0360091 A1 Nov. 18, 2021

Related U.S. Application Data

(60) Provisional application No. 62/942,758, filed on Dec. 3, 2019.

(51) Int. Cl.
*H04L 67/564* (2022.01)
*H04L 69/22* (2022.01)
(Continued)

(52) U.S. Cl.
CPC ............ *H04L 69/22* (2013.01); *H04L 67/535* (2022.05); *H04L 67/564* (2022.05); *H04L 67/5651* (2022.05); *H04L 63/1416* (2013.01)

(58) Field of Classification Search
None
See application file for complete search history.

(56) References Cited

U.S. PATENT DOCUMENTS 9,621,707 B2 4/2017 Way et al.
10,158,733 B2 12/2018 Ungerer et al.
(Continued)

OTHER PUBLICATIONS

"Using Network Traffic to Remotely Identify the Type of Applications Executing on Mobile Devices." In the Proceedings of IEEE Mobile Security Technologies (MoST). 2013. (Retrieved on Jan. 3, 2021). Retrieved from the Internet: <https://www.researchgate.net/profile/William_Robinson11/publication/261697814_Using_network_traffic_to_remotely_identify_the_type_of_applications_executing_on_mobile_devices/links/0a85e534ffef2487b2000000/Using-network-traffic-to-remotely-identify-the-type-of-applications-executing-.

*Primary Examiner* — James A Edwards (57) ABSTRACT

In some embodiments, an active application is identified from an outgoing communication and/or what application is active on a device. In some embodiments, system will intercept and/or analyze a message sent by a computing device. For example, the system may run as an Internet proxy application on the device and/or on an Internet server. Optionally, the system reads message header and/or uses information from the header to determine what application sent the message. In some embodiments, the system includes a procedure that recognizes communications that are not of interest and/or discards these communications. Additionally or alternatively, the system includes a procedure that truncates a communication header and/or eliminates data not useful in determining the source of the communication. Optionally, the system uses a short list to identify the application and a long list when the application was not recognized based on the short list.

18 Claims, 7 Drawing Sheets

(51) Int. Cl.
*H04L 67/50* (2022.01)
*H04L 67/5651* (2022.01)
*H04L 9/40* (2022.01)

(56) References Cited

U.S. PATENT DOCUMENTS

| | | | |
|---|---|---|---|
| 10,209,978 B1* | 2/2019 | Dennis | H04L 41/082 |
| 10,237,280 B2 | 3/2019 | Day, II et al. | |
| 10,263,903 B2 | 4/2019 | Xu | |
| 10,326,789 B1* | 6/2019 | Vines | H04L 67/02 |
| 2004/0210469 A1* | 10/2004 | Jones | G06Q 30/016 |
| | | | 705/7.39 |
| 2009/0154480 A1* | 6/2009 | Arai | H04L 12/413 |
| | | | 370/401 |
| 2009/0252148 A1* | 10/2009 | Dolganow | H04L 67/2819 |
| | | | 370/351 |
| 2010/0077161 A1* | 3/2010 | Stoakes | G06F 11/1453 |
| | | | 711/162 |
| 2010/0332592 A1* | 12/2010 | Hamada | H04L 2101/30 |
| | | | 709/203 |
| 2012/0005719 A1* | 1/2012 | McDougal | G06F 21/562 |
| | | | 709/224 |
| 2012/0284256 A1* | 11/2012 | Mahajan | G06F 16/9537 |
| | | | 707/722 |
| 2014/0006347 A1* | 1/2014 | Qureshi | H04L 9/0822 |
| | | | 707/621 |
| 2014/0122647 A1* | 5/2014 | Mischook | H04L 67/561 |
| | | | 709/217 |
| 2014/0297838 A1 | 10/2014 | Qureshi | |
| 2017/0346853 A1* | 11/2017 | Wyatt | H04L 9/3265 |
| 2018/0367560 A1 | 12/2018 | Mahaffey et al. | |
| 2019/0149445 A1 | 5/2019 | Kelley, Jr. et al. | |
| 2019/0173849 A1* | 6/2019 | Lapidous | H04L 61/1511 |
| 2019/0327338 A1* | 10/2019 | Meadors | H04L 67/56 |
| 2020/0322240 A1* | 10/2020 | Perkins | H04L 43/0876 |

* cited by examiner

CONNECT play.googleapis.com:443 ← 446
HTTP/1.1
Host: play.googleapis.com ← 444
User-Agent: Waze/3 CFNetwork/1120
Darwin/19.0.0 ← 442
Connection: keep-alive
Proxy-Connection: keep-alive

FIG. 4B

CONNECT static.whatsapp.net:443 HTTP/1.1 ← 446'
Host: static.whatsapp.net ← 444'
User-Agent: WhatsApp/2.19.92 iOS/13.2
Device/iPhone_6s ← 442'
Connection: keep-alive
Proxy-Connection: keep-alive

FIG. 5

| Full User Agent | Summary |
|---|---|
| com.google.Gmail/6.0.190822 google-api-objc-client/3.0 iPhone/13.1.3 hw/iPhone10_6 (gzip) | com.google.Gmail |
| Eagles/4.0.1 CFNetwork/1107.1 Darwin/19.0.0 iOS/13.1.3 RoverCampaignsSDK/3.5.1 | Eagles_RoverCampaignsSDK |
| rtcreportingd (unknown version) CFNetwork/1107.1 Darwin/19.0.0 | rtcreportingd |

FAST NETWORK RECOGNITION OF ACTIVE APPLICATIONS FOR REAL TIME USER NOTIFICATION

FIELD AND BACKGROUND OF THE INVENTION

The present invention, in some embodiments thereof, relates to a system and method for fast recognition of active applications and, more particularly, but not exclusively, to a method for real time user notifications for iOS.

U.S. Pat. No. 9,621,707 appears to disclose, "A system and method for discouraging the in appropriate use of a mobile device including registering a mobile device with a monitoring application running on a system coupled with a network. A mobile device is linked with the monitoring application through the network. The operational status of the mobile device is monitored to detect if a change occurs in the operational status. A change in the operational status of the mobile device is reported to the monitoring program with time information and the status change is displayed in a graphical interface, and a notification message is sent to a system user. Beacons might also be implemented to advise a device user to disable a mobile device to be monitored."

U.S. patent Ser. No. 10/158,733 appears to disclose, "A method for tracking usage of applications on a mobile device that includes a virtual private network (VPN) application. The VPN application includes a rule dictionary to store a rule for each application that is executable on the mobile device. A rule comprises an identifier for the application and an associated regular expression. To create a rule, a new application is installed on the mobile device and executed to create network traffic. The network traffic from the new application is inspected and a regular expression that matches the new application is created and stored in the rules dictionary. Once the rule is stored, a usage of the application can be identified based on monitoring the network traffic and searching the rule dictionary to identify a matching application. Once a matching application is found, the usage metric of the application is updated."

U.S. patent Ser. No. 10/237,280 appears to disclose that, "Devices, systems, and methods for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. The module can also monitor location data. Moreover, the system can include an analysis server that can identify potentially harmful language, images, and websites. Further, the system can include a parent portal. The parent portal can receive results from the analysis serve" US Patent Publication no. 20180367560 appears to disclose that, "Data is collected from a set of devices according to a data collection policy. The data is associated with device configuration, device state, or device behavior. A norm is established using the collected data. A different data collection policy is established based on the norm. Data is collected from a particular device according to the different data collection policy. The norm is compared to the data collected from the particular device. If there is a deviation outside of a threshold deviation between the norm and the data collected from the particular device, a message is transmitted to an administrator."

SUMMARY OF THE INVENTION

According to an aspect of some embodiments of the invention, there is provided a method of recognizing an active application on a device including: Intercepting a communication from the device; truncating a portion of a header of the communication to a truncated string; searching the truncated string for an identifying substring characteristic of an application.

According to some embodiments of the invention, the searching includes a preliminary search using a short list of applications and a further search using a longer list of applications when the preliminary search fails to identify the active application.

According to some embodiments of the invention, the truncating includes removing a common substring from the header.

According to some embodiments of the invention, the truncating includes applying between 5 to 100 regular expressions to the portion of the header.

According to some embodiments of the invention, the portion of the header includes a User-Agent.

According to some embodiments of the invention, the portion of the header includes more than one User-Agent combined together.

According to some embodiments of the invention, the searching is for one of a list of applications known to have been installed onto the device.

According to some embodiments of the invention, the searching is for one of a list of applications and the searching is repeated for a short list of applications and a long list of applications.

According to some embodiments of the invention, the method further includes searching for a target address in the header and further including: rejecting an application identified in the step of search when the application does not match the target address.

According to some embodiments of the invention, the method further includes: discarding a common communication.

According to some embodiments of the invention, the method further includes: disregarding a common communication.

According to some embodiments of the invention, the method further includes: sending a notification to a user interface of the device including information about an application identified in the searching.

According to some embodiments of the invention, the intercepting is performed by a proxy application running locally on the device and wherein the notification is sent by a remote server.

According to some embodiments of the invention, the notification includes at least one of a text message and a voice message.

According to some embodiments of the invention, the method further includes blocking the communication.

According to an aspect of some embodiments of the invention, there is provided a system for recognizing an active application on a device: a user device communicating over a network; a proxy application running on the user device the proxy application configured for: Intercepting a communication from the device; truncating a portion of a header of the communication to a truncated string; searching the truncated string for an identifying substring characteristic of an application.

According to some embodiments of the invention, the system further includes: a long list of applications and a short list of application and wherein the proxy application is configured to search for an application from the short list and when an application from the short list is not found further search from the long list.

According to some embodiments of the invention, the system further includes: a remote server configured for receiving identification of the application from the proxy application and sending a notification to a user interface of the device identifying the application.

According to some embodiments of the invention, the system further includes: a set of between 1 and 50 regular expressions for performing the truncating.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a system and method for fast recognition of active applications and, more particularly, but not exclusively, to a method for real time user notifications for iOS.

Overview

An aspect of some embodiments of the current invention relates to notifying a user of issues related to an application that is active on a user computing device. In some embodiments, it is desirable for an external actor (e.g. an application running in background on the device and/or an Internet server) to notify a user about issues with an active application running on a computing device. In some operating systems, (for example iOS running on an Apple platforms unless otherwise stated herein the term iOS also includes ipadOS) information on active applications on a device may not be available to external actors. Furthermore, external actors may be inhibited from taking control (for example in order to deliver a notification) of the device from an active application.

In some embodiments, a virus shield, a spyware shield and/or a content filtering application may block certain applications and/or block Internet access and/or direct Internet requests to a remote server that may allow. For example the server may block and/or filter access. This may cause applications and/or a device to malfunction (e.g. "crash" and/or not function properly). Without a timely accurate message, the user will not know what happened. For example, he might blame an Internet provider or a bug in the application or a fault in his device. In some embodiments, a parent and/or an employer may want to track what applications a user is running and/or for how long. In some embodiments, a person may want to get warnings and/or keep track of when he is spending a large amount of time on certain applications. In some embodiments it may be desirable to collect statistics on the user of one or more applications. In some or all of these cases, it will be desirable to recognize the application and/or send the notification in a very short time period (for example in a short enough time period that the user will not have changed applications in the interim). In some or all of these cases it may be important that a determination of a running application is accurate. Otherwise, the system may interrupt use of the device unnecessarily and/or give an inaccurate message to a user.

In some embodiments, a proxy application intercepts an Internet communication. The communication is analyzed by the proxy application and/or in support of a remote server. In some embodiments, the proxy will alert a user by sending a notification through an Internet server back to the device, for example in the form of a remote communication (e.g. a system alert (e.g. via a VPN and/or a Proxy application)

and/or as a phone call (e.g. via VoIP) and/or as a text message (e.g. SMS) and/or as a multi-media message).

As aspect of some embodiments of the current invention relates to determining from an outgoing communication what application sent the communication and/or what application is active on a device. In some embodiments, system will intercept and/or analyze a message sent by a computing device. For example, the system may run as an Internet proxy application on the device and/or on an Internet server. Optionally, the system reads message header and/or uses information from the header to determine what application sent the message. Optionally, various procedures may be used to achieve recognition of the sending application quickly and/or accurately.

In some embodiments, the system includes a procedure that quickly recognizes common communications that are not of interest and/or discards these communications without wasting computing time analyzing these messages. Additionally or alternatively, the system includes a procedure that quickly truncates a communication header and/or eliminates data that is not valuable in determining the source of the communication. This may, in some embodiments, reduce the volume of data that to be searched and/or analyzed. In some embodiments, the system tries to recognize one of small population of potential source applications and/or progressively searches for a larger population of potential source applications when the source is not recognized from the smaller population. For example, the system may determine if the current message is from the same active application as last recognized communication and/or from a set of recently used applications and/or from a set of applications known to have been installed on the device (from example from a list of installed applications from a Mobile Device Management (MDM) server) and/or from a list of popular applications (optionally filtered according to known characteristics of a device and/or its user) and/or from a large list of applications available for the device. In some embodiments, a source application will be recognized from a proxy header, for example from a User-Agent and/or the Host/IP.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
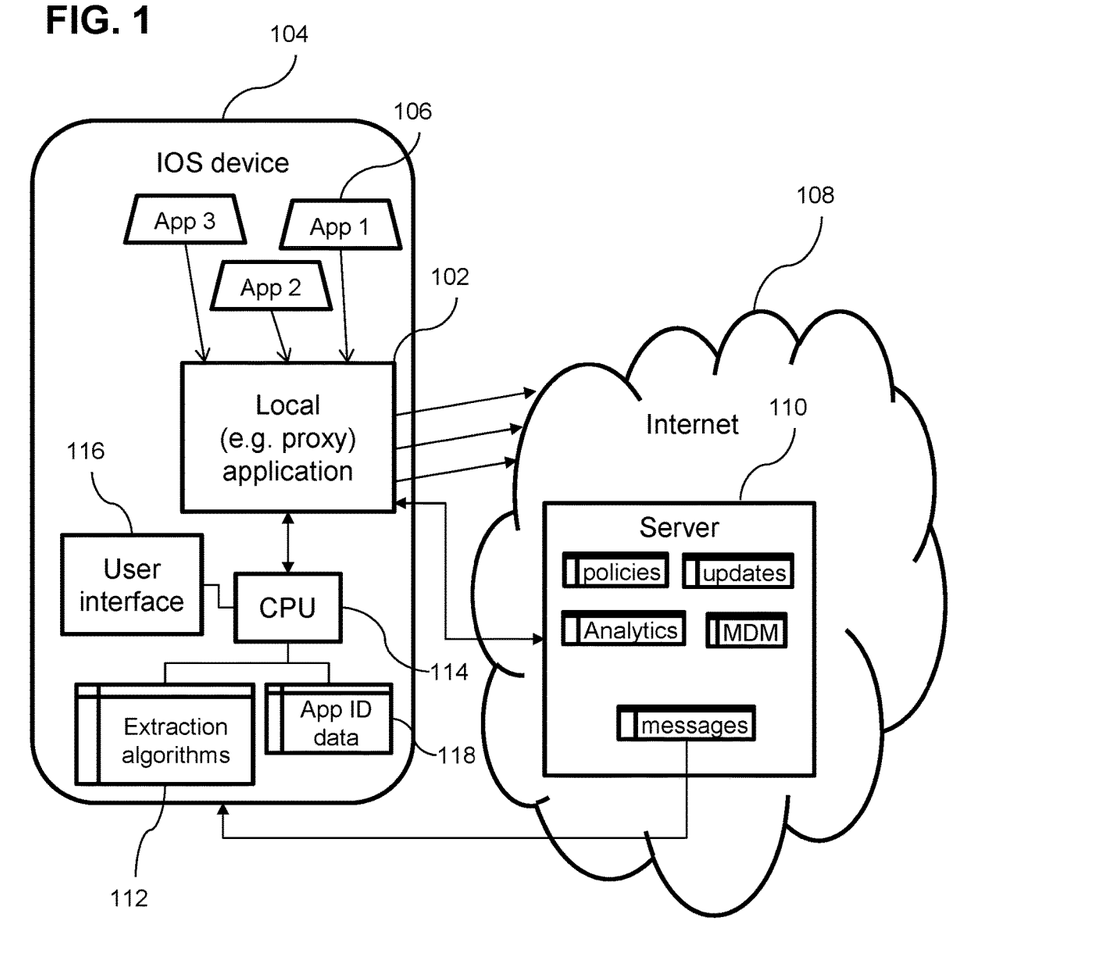
FIG. 1 is a schematic illustration of a system for identification of an active application and/or user notification in accordance with an embodiment of the current invention.

Referring now to the drawings, FIG. 1 is a schematic illustration of a system for identification of an active application 106 and/or user notification in accordance with an embodiment of the current invention. In some embodiments, a local application 102 (for example the local application 102 may include an Internet proxy application) may run on an iOS device 104. For example, when an active application 106 sends a communication from the device 104 to the Internet 108, a proxy application intercepts the communication and/or supplies information about the communication to the local application 102. The local application 102 optionally includes algorithms 112 to identify the active application 106 that sent the communication. The algorithms 112 may be stored on the device 104 itself and/or be run by a processor 114 of the device 104. Optionally, the proxy application may communicate with a remote server 110. For example, the remote server 110 may supply further algorithms 112 and/or computing power should the local application 102 fail to identify the active application 106 with local resources. Alternatively or additionally, the proxy application may include instructions to intervene to prevent certain applications and/or actions on the device 104. Alternatively or additionally, the proxy application may include instructions for sending a notification to a user. For example, the notification may include information about an intervention and/or an active application 106 running on the device 104 and/or an action taken by the active application. Optionally, the remote server 110 will include updates and/or further policies accessible to the proxy application. Optionally, the proxy application will use the remote server 110 to access a user interface 116 of the device 104, for example, to send notification to the device 104. For example, the notification may be sent using local resources and/or it may be sent over the Internet 108 by the Internet server 110. For example, the notification may be sent as a system alert (e.g. via a VPN and/or a Proxy application) and/or as a phone call (e.g. via VoIP) and/or as a text message (e.g. SMS) and/or as a multi-media message.

In some embodiments, a local application 102 will include algorithms 112 and/or data 118 for quick recognition of an active application sending a communication. For example, the local resources may include extraction algorithms 112 to extract significant data and/or communications from extraneous data and/or communications. For example, the local resources may include data 118 for identification of likely candidates for an active application 106. For example, the local resources may include data on common interventions and/or common notifications. Optionally, the local application 102 will have access to data 118 on unexpected and/or unusual applications, interventions and/or notifications. Alternatively or additionally, the server 110 may update data on the local device 104 and/or the local device 104 may update the server 110 with changes and/or recent activity on the local device 104. In some embodiments, the local resources (e.g. the Extraction algorithms and/or the ID data 118) may be part of the local proxy.

Figure 2A:
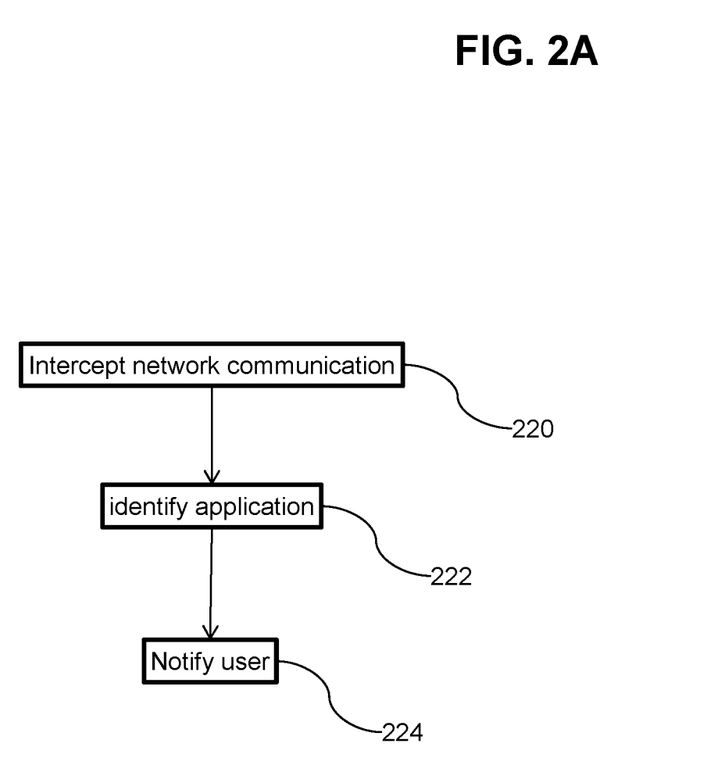
FIG. 2A is a flow chart illustration of a method for identification of an active application and/or user notification in accordance with an embodiment of the current invention.

FIG. 2A is a flow chart illustration of a method for identification of an active application in accordance with an embodiment of the current invention. In some embodiments, a communication to a network will be intercepted 120, for example by a network proxy application (for example as illustrated in FIG. 1). Optionally, an algorithm will be applied to recognize from the message the application from which the message originated. For example, identification 222 may include steps described in the method of FIG. 3. Optionally, a notification 224 will be generated and/or displayed by a user interface of the device sending the communication. For example, the message may be sent through a network messaging and/or a voice message. The notification 224, optionally includes information on the network communication (e.g. a communication was sent to a dangerous address and/or included unusual content) and/or on the application that sent the communication.

In some operating systems (for example iOS) do not give lists of active applications to external actors (for example a server on the Internet and/or a third-party application [e.g. even when the third-party application is running locally]). In some embodiments, the method as described herein allows bypassing these limitations by identification 222 of an application communicating over the Internet. In some cases, an operating system (e.g. iOS) will limit background processes (e.g. by limiting functionality and/or resources available to third party processes running in background). In such a case, when one identifies 222 an application sending Internet communication one may assume the process to be the active application on the device. For example, the system may assume that an application sending a communication is the active application when the application is a third-party application. In some embodiments, the system may include methods to recognize a third-party application and/or native applications (e.g. especially those native applications that commonly send communications over the Internet). For example, the system may assume that an application sending a message is the active application when the application is a third-party application and/or is not a one of a set of recognizable native applications. Limitations of background processes may also be used to verify the assumption that a communication is from the same process as a previous application. For example, a communication may be checked if it is from one of a known list of applications that are apt to send communications from background (e.g. certain native applications in iOS) and/or an attempt may be made to positively determine the source of the communication and/or an attempt may be made to eliminate the possibility that application sending a previous communication is the same as the current communication, For example, if a communication is not from one of a known list of applications that are apt to send communications from background (e.g. certain native applications in iOS) and/or the source of the communication is positively identified 222 and/or the possibility that application sending a previous communication is the same as the current communication, then the source of the communication may be assumed to be the same as the previous communication.

In some embodiments, application use may be tracked. For example, a list of applications used on the device may be kept (for example for oversight of use of the device and/or to supply individual statistics and/or to enforce a policy concerning permitted use of applications, permitted times of use of an application and/or permitted locations of use of the application and/or permitted quantities of use of the applications. Optionally a notification 224 may be sent to a user interface of the device in response to a misuse of an application. Alternatively or additionally, a list of applications in use on a device may be used to identify 222 an application that sends a communication. For example, a system in accordance with an embodiment of the current invention may try to determine which of the applications known to have been used on a device is the source of a communication. If the system cannot identify 222 one of the applications known that have run on the device it may optionally search for other potential applications. When a new application not previously known to have run on the device is identified 222, the new application may be added to the list of applications on the device. A list of previously used applications may be compared to a source of a current message to determine when a new application has been installed to a device. Optionally, installation of a new application and/or installation of one of a list of applications and/or installation of an application that is not on a list of applications may trigger an intervention and/or a warning message.

Figure 2B:
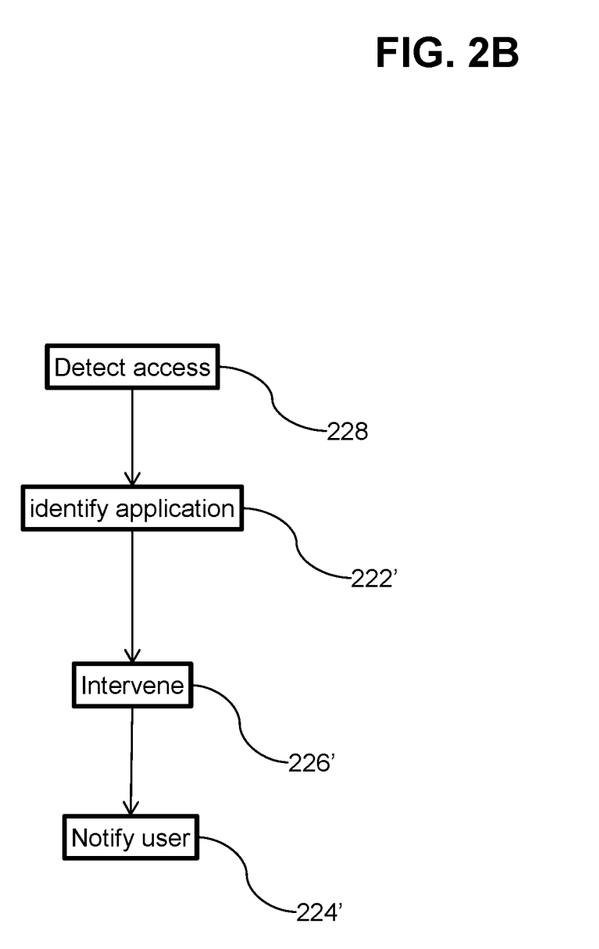
FIG. 2B is a flow chart illustration of a method for intervention and/or user notification in accordance with an embodiment of the current invention.

FIG. 2B is a flow chart illustration of a method for intervention and/or user notification 224' in accordance with an embodiment of the current invention. A system in accordance with some embodiments of the current invention may intervene 226 in functioning of a device. For example, the system may intervene 226 when it detects 228 an application running on the device performs a suspicious action and/or accesses restricted data and/or access a restricted web site and/or when a communication includes prohibited content. Alternatively or additionally, an intervention 226 and/or notification 224' may be triggered when by use of a pre-specified application and/or by a prespecified misuse of that application (e.g. use of the application at a prohibited time and/or at a prohibited location and/or for too much time). Optionally, when the system intervenes 226, it sends a message to a user interface of the device. For example, the notification 224' may identify 222' the system that performed the intervention 226 and/or explain what action triggered the intervention 226 and/or tell the use what application was active on the device when the intervention 226 was triggered. For example, the system may include a system as described in various embodiments herein (e.g. in FIG. 1) and/or may identify 222' the application that was active when the intervention 226 was triggered using any method described in the embodiments herein. In some embodiments, the system may contact a server. Optionally, the server may analyze the request and/or to decide how to respond. For example, the system could send data to the server about what app was running and/or what access to the Internet was performed. Optionally, the server may decide how to act and/or take direction action and/or contact the system and tell the system how to respond.

In some embodiments, an intervention 226 may be performed by a local application and/or by a remote server. Optionally, an intervention 226 may include preventing access to an Internet site and/or blocking a communication and/or modifying a communication.

A system in accordance with some embodiments of the current invention may filter incoming and/or outgoing communications. For example, filtering may be performed by a local application and/or a remote server. For example, filtering may include checking the communication for suspicious and/or prohibited content. For example, filtering may include identifying 222' communication that address suspicious and/or prohibited web sites. In some embodiments one actor (e.g. the local application and/or the server) will filter the communication and/or another actor will send the notification 224' to the user interface. For example, notification 224' may be as described in any of the embodiments herein. Optionally, filtering results may trigger an intervention 226 and/or sending a notification 224'.

Figure 3:
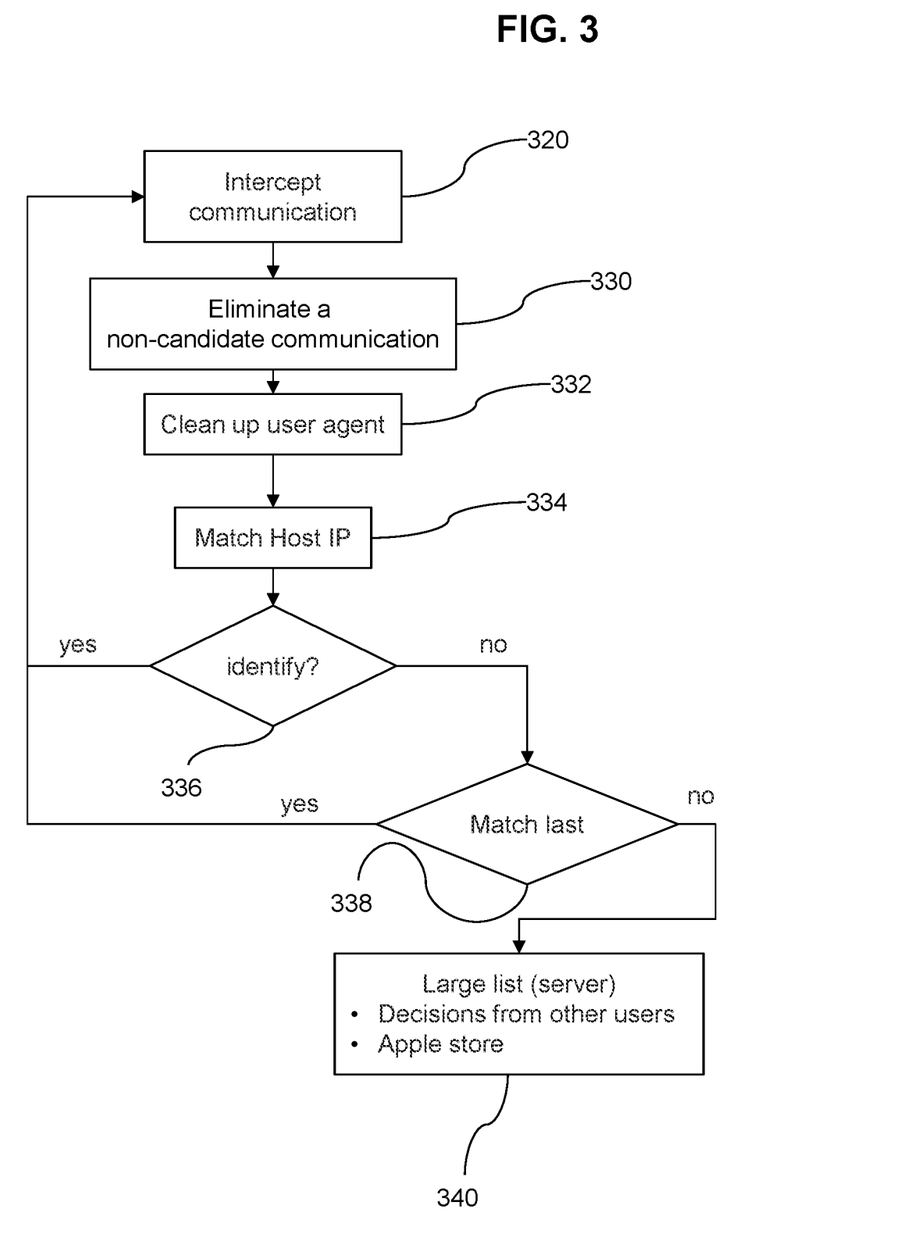
FIG. 3 is a is a flow chart illustration of a method for fast recognition of an application from a header in accordance with an embodiment of the current invention.

FIG. 3 is a is a flow chart illustration of a method for fast recognition of an application from a header in accordance with an embodiment of the current invention. In some embodiments, a system may include a process for simplifying and/or making faster identification of an application that is active on a device and/or sending a communication. Optionally, faster methods may be applied to identify the application and/or when these methods do not lead to positive identification, more complicated and/or time consuming methodologies may be used. In some embodiments, the system gives a positive identification of an active application faster than other methodologies.

In some embodiments, a system may intercept 320 a communication. For example, Internet communications may be intercepted 320 by proxy. Optionally the proxy may include an application running on the device and/or on a remote server. For example, the communication may include one or more packets of data. Optionally, data may be collected from the communications to identify an application that is sending the communication and/or active on the device.

In some embodiments, the system may attempt to reduce the dataset. For example, the system may identify and/or eliminate 330 (e.g. discard) data that is not useful for determining the source of the communication and/or an active application. For example, data packets sent by native applications and/or known applications that are not of interest and/or applications known to run in the background (e.g. native applications) may be eliminated 330. Additionally or alternatively, common text or data within a packet (e.g. within the packet header e.g. within a Host and/or User-Agent and/or CONNECT section) that is general and/or used by a large class of applications may be cleaned 332 (for example as illustrated if FIG. 5).

In some embodiments, data of a Host/IP and/or target IP address is matched 334 to determine and/or verify the identify of an active application and/or an application that is a source of a communication. For example, when a Host/IP is unique to a particular application, the application may be used to identify the active application. For example, when there is an active application that is known to already have a connection with a certain host, a further communication to that host may be associated to the application. Alternatively or additionally, when an application is identified 336 from another source (e.g. the User-Agent) the Host/IP may be used to reject false identifications of the application (e.g. if the Host/IP does not match 338 a Host/IP known to be used by the application and/or is a Host/IP that is known not to be used by the application). In some embodiments, a mismatch 338 between a User-Agent and/or a Host/IP may lead to an intervention (for example blocking the communication and/or closing the application due to improper behavior).

In some embodiments, an application may be assumed to be the same as an application matched 338 in a previous communication. For example, when simple and/or fast identification methods fail, a system may try to reject the assumption that the current communication is from the same application as the last application identified as a source of a communication (for example based on presence of a User-Agent and/or Host/IP that is uncharacteristic of the application and/or due to a time lag between the current communications and a the previously identified communication being greater than a threshold). When the rejection fails, then the current application may be assumed to be the same as the last identified application. Alternatively or additionally, evidence may be sought to indicate that the current communication is the same as the source of the previously identified communication. When the evidence is found, the source of the current communication may be identified as the same as the previous communication.

In some embodiments, when fast methods to identify an active application fail, slower methods may be used. For example, if the Host/IP of a communication does not match a list of applications known to be on the particular device and/or a short list of popular applications and/or a short list of applications that are tailored to a particular user, the system may search for a match to a larger database 340 (e.g. a list acquired from an Apple play store) and/or to lists of applications from other users.

Figure 4A:
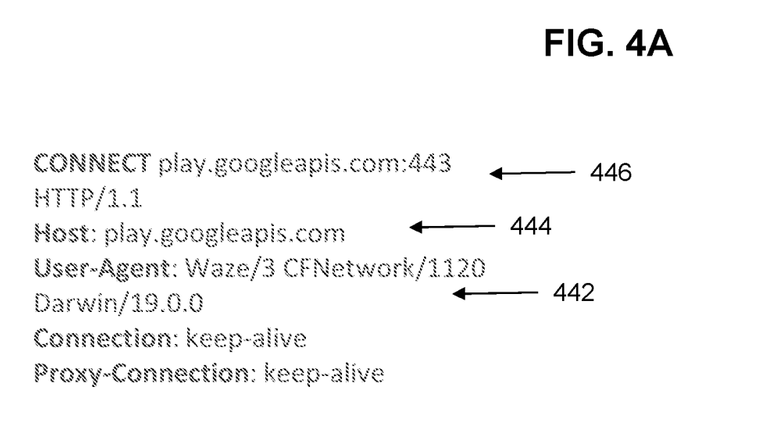
FIG. 4A is an example of a header.
Figure 4B:
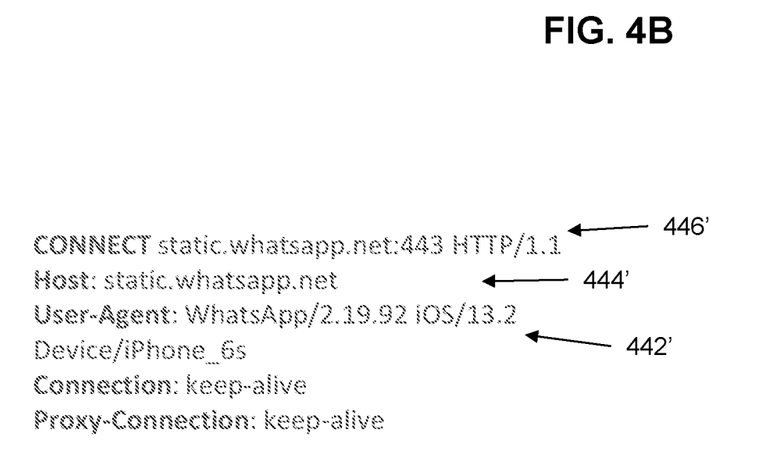
FIG. 4B is an example of a header.

FIGS. 4A and 4B are examples of data from communication headers. In some embodiments a header may be associated with a data packet. Optionally, the header may include data on a source application and/or on a target recipient. In some cases, a header will not be encrypted and/or will be easily read. In some cases, the contents of a message not in the header may be encrypted in such a way that the contents are unavailable to an external actor and/or accessing the data will interrupt the communication chain. Optionally, a proxy application may have access to a header without requiring encryption and/or disturbing the communication. In some embodiments data in the header is used to determine the application that sent the message and/or that receives the message. For example, from the header of FIG. 4A in the User-Agent 442 section it appears that the source application is Waze. We can see that the Host/IP 444 and/or Connect 446 sections which address Google application web sites are a reasonable match target for the assumed application. For example, from the header of FIG. 4B in the User-Agent 442' section it appears that the source application is WhatsApp. We are can see that the Host/IP 444' and/or Connect 446' sections which address WhatsApp web sites are a reasonable match target for the assumed application.

Figure 5:
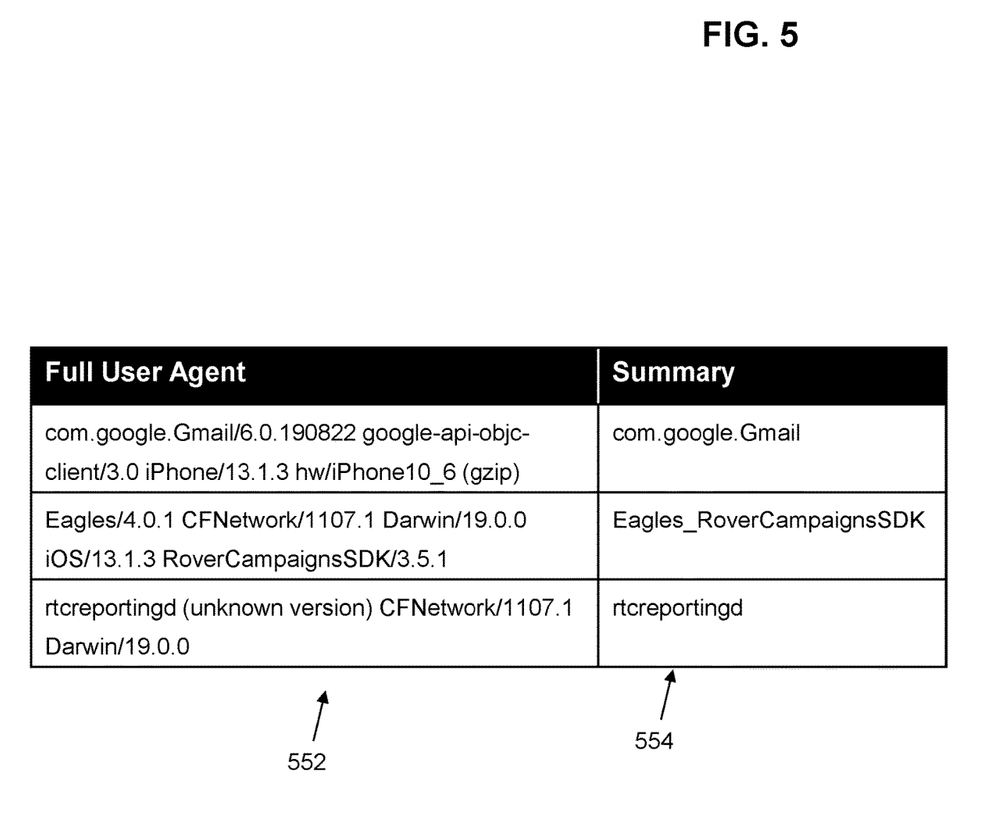
FIG. 5 illustrates examples of truncated headers in accordance with embodiments of the current invention.

FIG. 5 illustrates examples of truncated headers in accordance with embodiments of the current invention. In some cases, it may be difficult to recognize the source application from a header. For example, the User-Agent section may contain a lot of extraneous text making it difficult to decide where is the name of the source application. In some cases, it may be harder to recognized the source application, for example when the application is less well known. In some embodiments, a system includes a truncating routine that removes extraneous material for a header. For example, common text strings that are found in a headers and/or numbers and/or common words (e.g. as "version") may be removed from the header. Optionally, truncating a header will make it easier and/or faster to recover the name of an application that is the source of the message. In some cases, a truncating routine will not require information and/or not make assumptions about the application which is sending the message. For example, the complication of truncated algorithm may not scale linearly with the number of possible source applications for which the system is searching.

In some embodiments, algorithms to truncate messages (e.g. regular expressions) will develop over time and/or be shared. For example, a library of algorithms may be stored on a remote server and/or updated. For example, artificial intelligence may be used to pick up patterns. Optionally, in some cases, once a source application is recognized, the User-Agent truncating routines will be refined to more quickly reaching the identified source from the header. In some embodiments, correlation between the User-Agent and/or other sections of the header (e.g. the Host/IP and/or Connect sections) are used to determine which parts of the User-Agent are relevant and/or which parts are to be truncated. Alternatively or additionally, truncation routines (e.g. regular expressions) may stored on a local machine and/or periodically updated from a remote server. For example, truncating header may be achieved by applying between 1 to 5 and/or 5 to 10 and/or 10 to 50 and/or 50 to 100 and/or 100 to 1000 regular expression to the header.

In some embodiments, analyzing the User-Agent can be difficult. for example, User-Agents from even the same app—may differ in various ways. For example, unfiltered user agent fields 552 may be filtered to a summary field 554. differences may result from dependent on the app version, the OS version and/or other causes. In some embodiments, truncating may include throwing out irrelevant phrases (e.g. iOS, version, iPhone, client, phone, unknown, google, gzip). Developing and/or updating procedures may use for example Artificial intelligence and/or manual methodologies. In some cases, a header may include multiple User-Agents. Multiple User-Agents, may make the identification process more complex and/or difficult. For example, in some cases, it may be difficult to map multiple User-Agents to one application. In some embodiments a process will combine some or all of the multiple User-Agents in one or more communications and/or truncate them to one string that can be mapped to one application. In some embodiments, for example, when it is reasonable to assume that multiple packets where sent by a single application. User-Agents from multiple packets will be combined and/or truncated into one string.

Figure 6:
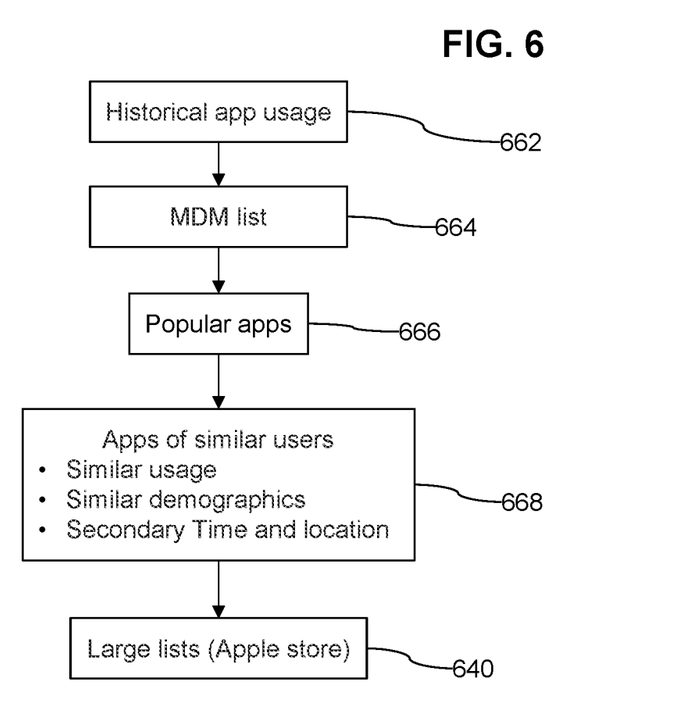
FIG. 6 is an illustration of databases for recognition of an active application in accordance with an embodiment of the current invention.

FIG. 6 is an illustration of databases for recognition of an active application in accordance with an embodiment of the current invention. For example, the database may include incrementally more complicated lists of applications. Optionally, the system will first try to recognize an application using a simple list of applications, for example, to match a communication to one of a few applications that were recognized from the last communication and/or very a recent communication 662. Alternatively or additionally, the application may be recognized from a list of active communications. For example, a list of active communications may be acquired from a local proxy. Alternatively or additionally, the system may try to search for applications on a relatively short lists of applications known to be on the device. For example, in some cases the system may have a list of applications on the device that was recently compiled by an MDM 664 server and/or the system may keep a list of applications that have been recognized as sending communications from the device. Alternatively or additionally (for example, when the active application is not recognized from a shorter list, the system may search for an application from a list of generally popular 666 applications and/or a list of applications that are associated with the device (for example, based on the preferences of the user and/or demographic data 668 about a user and/or based on secondary data such as applications that the user and/or others often use at the current time and/or location). In some cases, for example where the active application was not be recognized from a short list of applications, the system will search from an application matching an application from a long list of applications (for example a long list of applications may be derived from an index of the Apple play store 640 and/or the like). In general, the order of operations will be chosen to get reliable identification quickly. In some cases, the order of which databases is checked first may differ from that shown in FIG. 6. For example, the system may sometimes check the MDM list first (especially if it is up to date and/or the record of historical app usage has a problem).

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of identifying a name of an active application that is performing a suspicious activity and that is sending a communication from a device to a network, the method configured to be performed on the device even when the device does not supply explicit information about the active application, the method comprising:

Intercepting an http header from the communication from the device to the network;

searching in a User-Agent field of said http header of the communication for an irrelevant phrase that is not relevant to identifying desired information including said active application on the device;

converting said User-Agent field into a truncated string by removing the irrelevant phrase found in said searching and throwing out the irrelevant phrase, said truncated string consisting of text that remains from the User-Agent field after said removing the irrelevant phrase;

identifying in the truncated string text characteristic of the active application that is sending the communication; and recovering a name of the active application that is sending the communication from the device based on the text characteristic of the active application;

sending a real time notification to a user of the device via a user interface of the device, said notification including said name of the active application from said recovering.

2. The method of claim 1, wherein said recovering includes a preliminary search using a short list of applications and a further search using a longer list of applications when said identifying fails based on said preliminary search.

3. The method of claim 1, wherein said searching for irrelevant phrase includes applying between 10 to 100 regular expressions to said User-Agent field.

4. The method of claim 1, wherein said searching includes more than one User-Agent field combined together.

5. The method of claim 1, wherein said identifying is for one of a list of applications known to have been installed onto the device.

6. The method of claim 1, further comprising recognizing for a target address in said header and further comprising: rejecting an application identified in said step of recovering when said application does not match said target address.

7. The method of claim 1, further comprising: discarding a communication from a native application of the device.

8. The method of claim 1, wherein said intercepting is performed by a proxy application running locally on the device and wherein said notification is sent by a remote server.

9. The method of claim 8, wherein said notification includes at least one of a text message and a voice message.

10. The method of claim 8, further comprising blocking said communication.

11. The method of claim 8, further comprising notifying a server of said communication.

12. The method of claim 11, wherein said server performs at least one action selected from blocking said communication and giving instructions to a local processor for responding to said communication.

13. The method of claim 1, wherein said suspicious activity includes at least one of accessing prohibited content, accessing suspicious content, use of the application at a prohibited time, accessing the application at a prohibited location, activation of the application for too much time, accessing a prohibited web site, or accessing a suspicious web site.

14. A system for identifying a name of an active application that is acting suspiciously and sending a communication from a user device to a network;

the system configured to be performed even when the device does not supply explicit information about the active application, the system comprising:

a proxy application running on said user device, said proxy application configured for:

intercepting the communication from the device;

searching in a User-Agent field of an http header of the communication for an irrelevant phrase that is not relevant to the information being sought to identifying the name of said active application;

converting said User-Agent field into a truncated string by removing the irrelevant phrase found in said searching;

identifying text characteristic of the active application in said truncated string;

recognizing the text characteristic of the active application sending the communication;

recovering a name of the active application based on the text characteristic of the active application;

sending a real time notification to a user of the device via a user interface of the device, said notification including said name of the active application from said recovering.

15. The system of claim 14, further comprising: a long list of applications and a short list of applications and wherein said proxy application is configured for said recognizing to be text characteristic of an application from said short list and when an application from said short list is not found, further search from said long list.

16. The system of claim 14, further comprising: a remote server configured for receiving the name of said active application from said proxy application and sending a notification to a user interface of said device identifying said active application.

17. The system of claim 14, further comprising: a set of between 10 and 50 regular expressions for performing said truncating.

18. The system of claim 14, wherein said acting suspiciously includes at least one of accessing prohibited content, accessing suspicious content, use of the application at a prohibited time, accessing the application at a prohibited location, activation of the application for too much time, accessing a prohibited web site, or accessing a suspicious web site.

* * * * *